United States Patent Office 3,579,718
Patented May 25, 1971

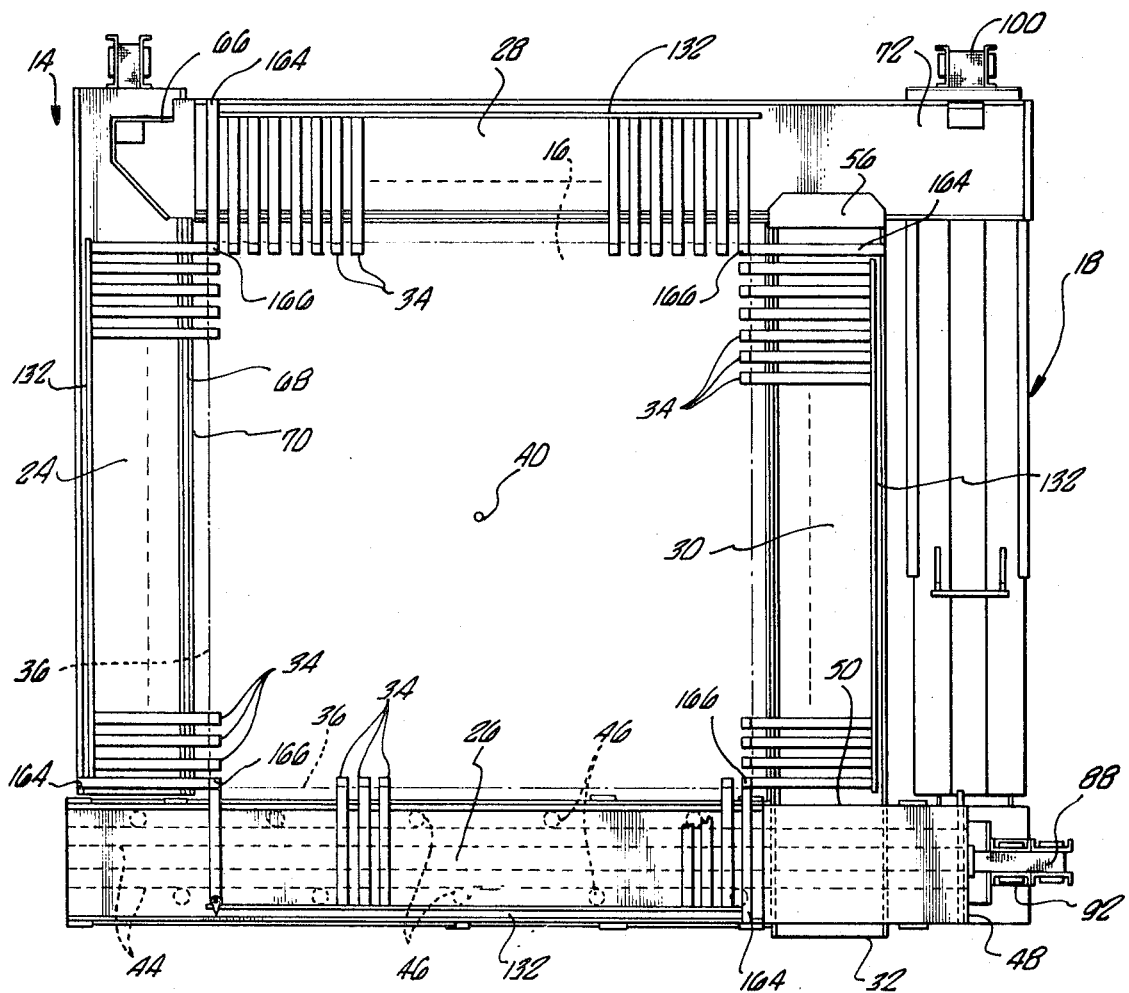
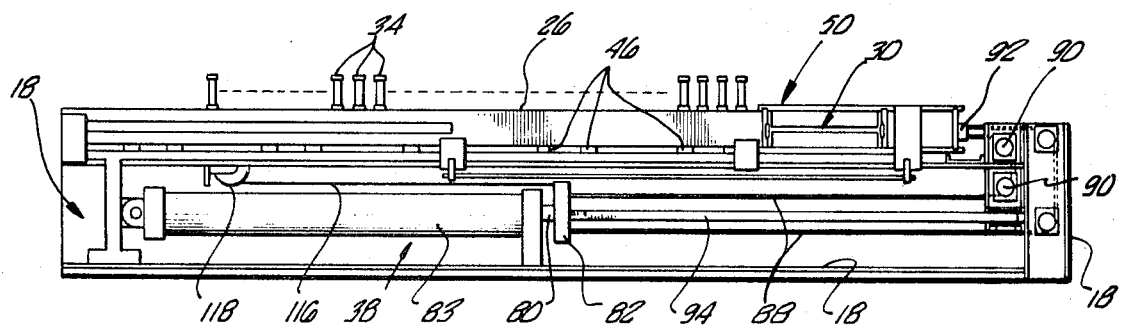

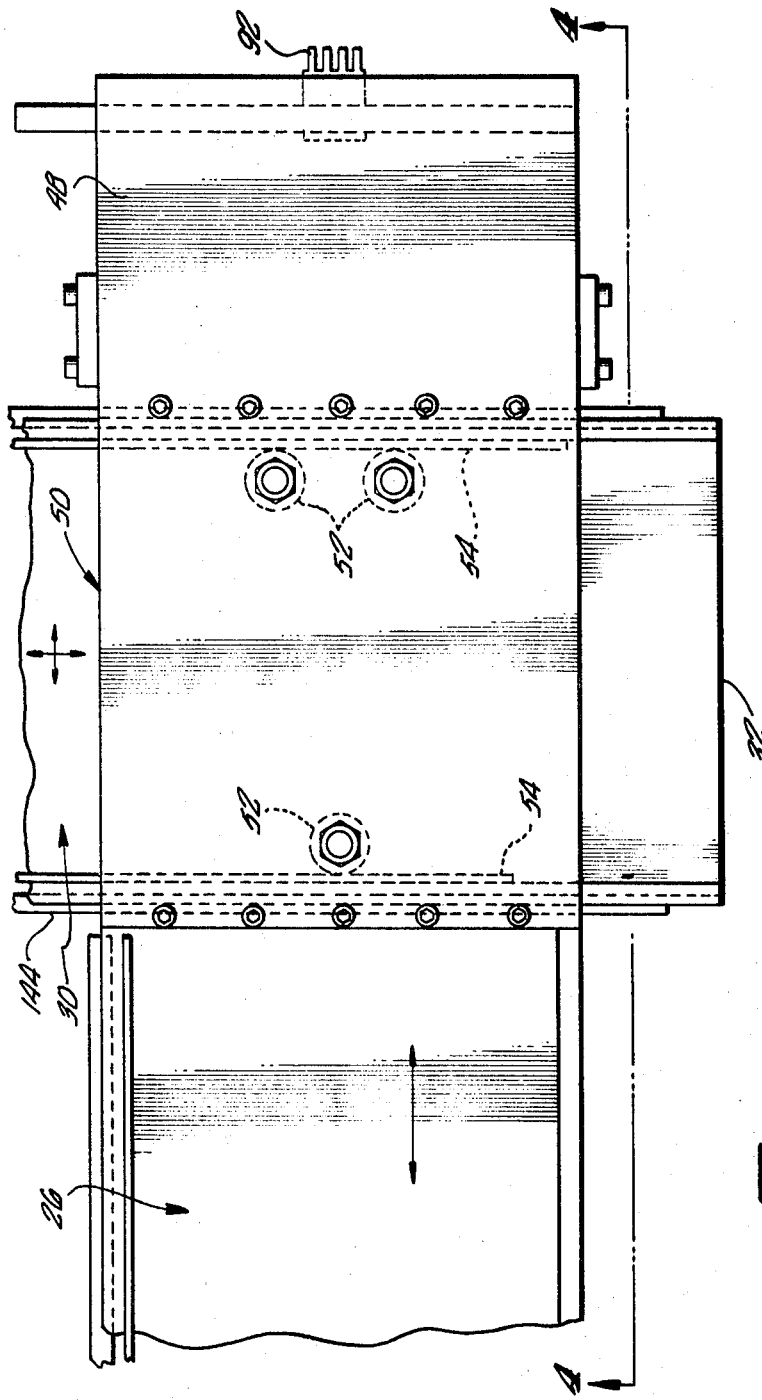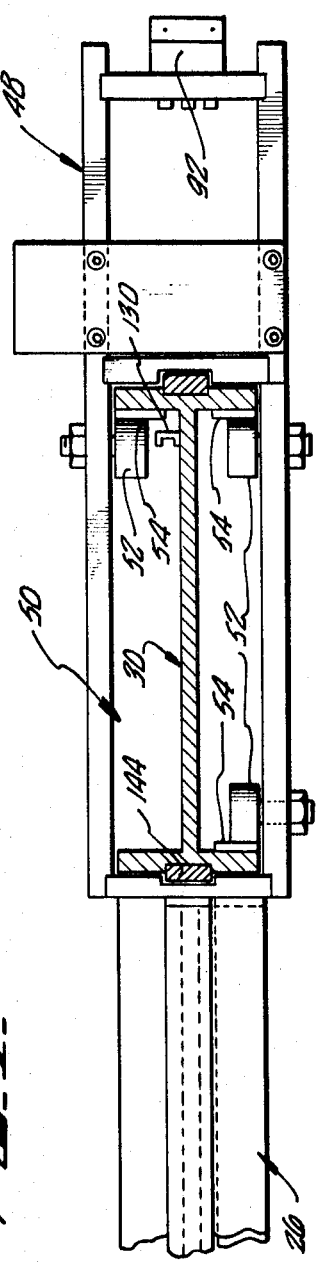

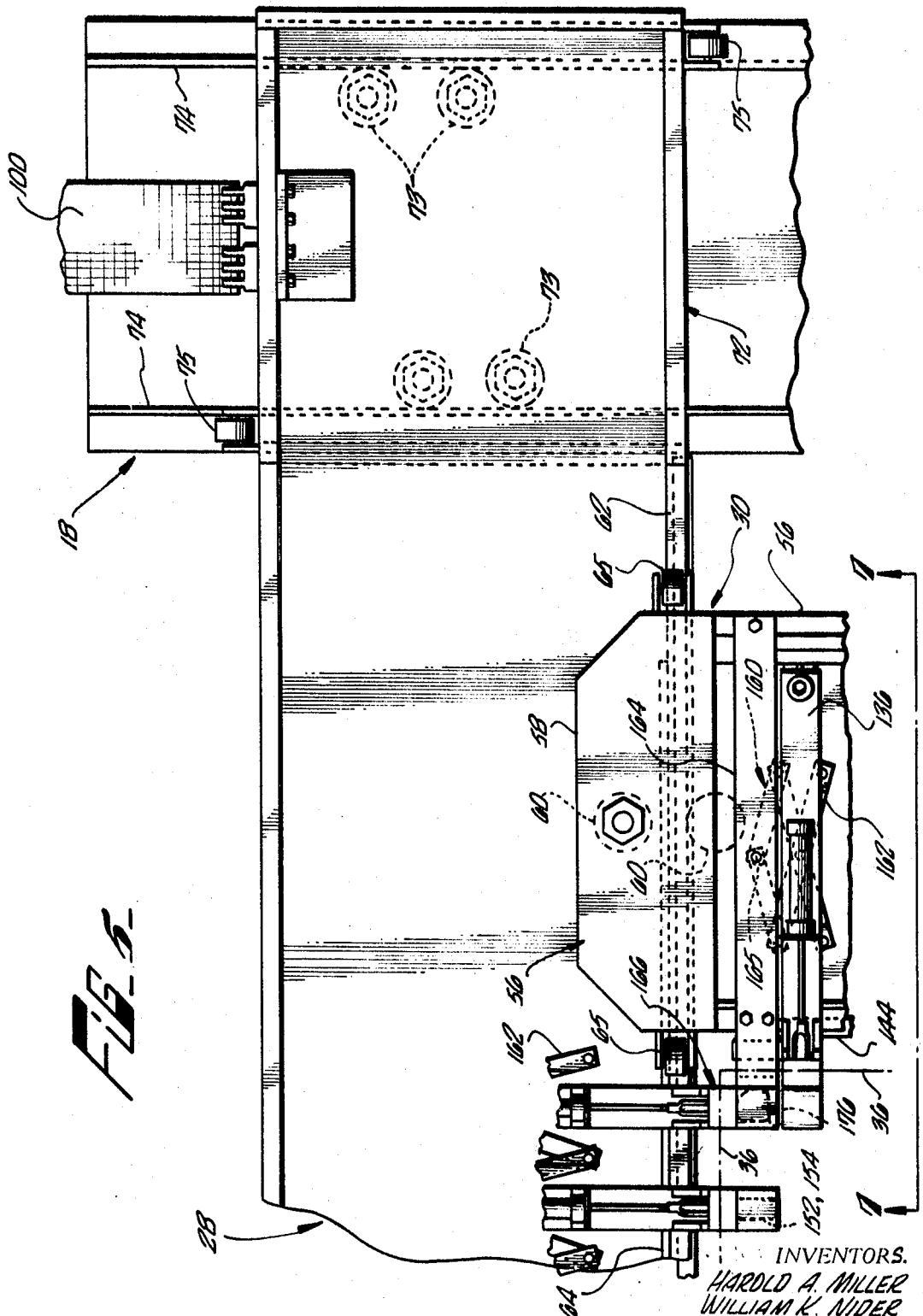

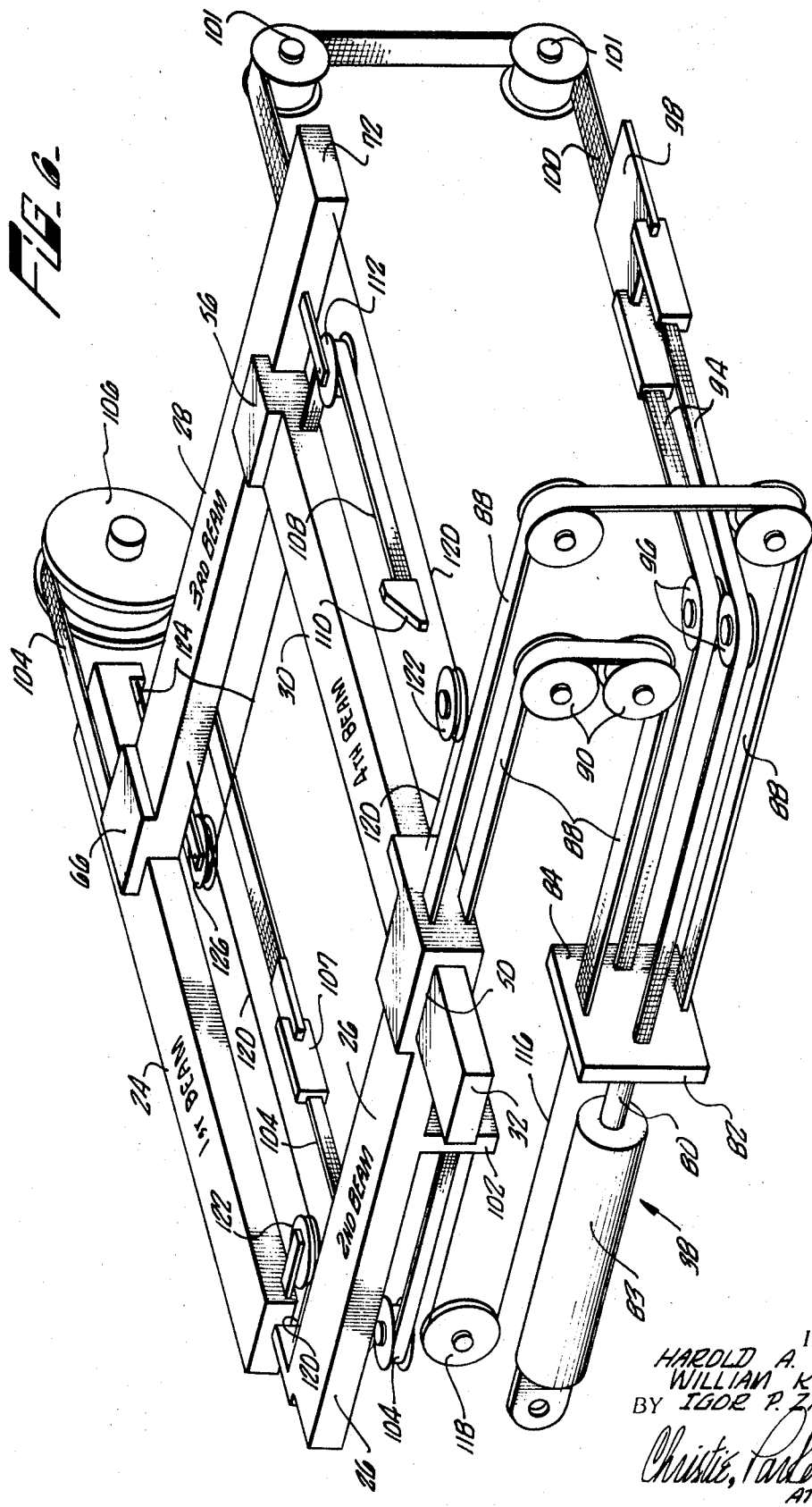

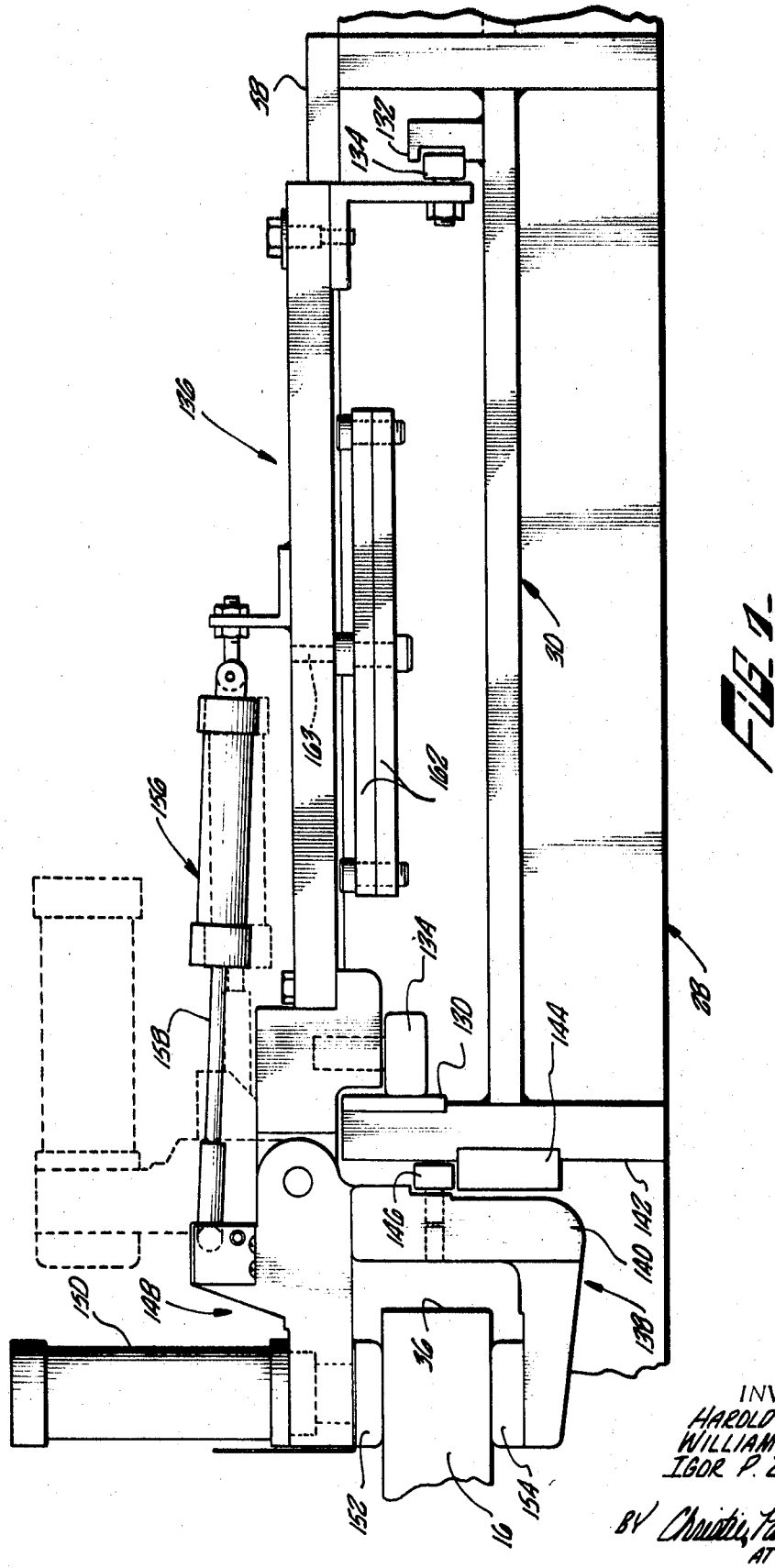

3,579,718
APPARATUS FOR STRETCHING SHEET
MATERIAL
Harold A. Miller, Castro Valley, William K. Nider,
Orinda, and Igor P. Zavialoff, San Francisco, Calif.,
assignors to The Sierracin Corporation, Sylmar, Calif.
Filed Oct. 17, 1968, Ser. No. 768,368
Int. Cl. B29c 17/02; D06c 3/08
U.S. Cl. 18—1
9 Claims

ABSTRACT OF THE DISCLOSURE

Apparatus for stretching sheet material having working beams arranged transversely to each other to define an enclosed area in which the sheet is placed. One of the beams is stationary to provide a fixed reference. Two of the beams are movable in a direction away from the center of the sheet. A fourth beam is movable along its axis to follow the stretching action. A plurality of clamps are mounted on the respective beams for gripping the sheet and connecting it with the working beams. Drive means are coupled to the movable beams to move them and subject the sheet to stretching forces. The sheet is stretched in transverse directions to increase its surface area and decrease its thickness.

BACKGROUND OF THE INVENTION

Field of the invention

This invention relates to apparatus for stretching sheet material and more particularly to apparatus for stretching sheet material in perpendicular directions. The invention is particularly suitable for stretching sheets of transparent acrylic.

State of the prior art

Semi-finished, thick sheets of material must frequently be reduced in thickness to arrive at the final desired product. Aside from the reduction of its thickness, physical properties of the material can be advantageously changed during the process. Thus, it is well known to cross-roll sheets of metal to obtain a superior structure. In other applications, sheets are stretched in a variety of ways to elongate them and to affect their physical properties.

One such application is encountered in the manufacture of clear plastic sheets which are used as windows, canopies, or other enclosures on aircraft. The use of plastic sheet is desirable not only from a standpoint of weight savings as compared to conventional glass, but also because plastic sheets can be made shatter resistant when struck by an object such as a bird or projectile. Untreated plastic sheets shatter much like conventional glass. If the sheets are stretched in perpendicular directions to reduce their thickness, their molecular structure is changed and the tendency to shatter is reduced substantially. Such a sheet, when pierced by a projectile, leaves a clean hole and the portions of the sheet surrounding the pierced hole do not shatter.

To obtain a stretched plastic sheet having the desired physical properties, a substantial reduction in the thickness between the original as-cast sheet and the final sheet is necessary. For example, a sheet of Plexiglas 55 is often reduced to one-half or one-third of its original thickness, say from two inches to three-quarters of an inch. Plexiglas II is sometimes reduced to one-sixth its original thickness. The stretching apparatus must therefore be capable of subjecting the sheets to substantial forces. At the same time the sheet must be pulled in a plane with equal forces acting perpendicular to each other. Slight variation in the forces applied to the sheet and its relative elongation in different directions may cause optical distortions and make it unusable for the exacting requirements of the aircraft industry.

One such stretching apparatus provides four rectangularly arranged members which move simultaneously away from the centerpoint of the rectangle defined by them. Each member has a separate actuator to exert the required force. The machines are relatively large and cumbersome and expensive to build since the movements of all members have to be closely coordinated to provide an even, coplanar and unidirectional pull. Aside from the expense in building and manufacturing such apparatus, it is not always satisfactory in operation. The independent actuators, even if electrically, hydraulically or mechanically coupled, do not always insure an equal distribution of forces. Additionally, an equal force distribution does not always assure equal travel. For example, one member can become jammed and its movement impaired while the others continue to move under the force exerted upon them. As a consequence the sheet is unevenly stretched, and it becomes optically distorted and unsatisfactory for many applications.

Another class of stretching apparatus provides linkages which are coupled to clamps gripping the sheet material to be stretched. The linkages are actuated at one or more points to move the clamps. They are constructed and arranged such that the clamps are spaced about the periphery of the sheet. They are relatively complicated and not well suited for the transmittal of large forces. For this reason, and because of their manufacturing cost and the expense of maintaining them in proper working condition, they have not come into general use.

SUMMARY OF THE INVENTION

This invention provides apparatus for subjecting sheet material to plane stresses acting in perpendicular directions to thereby increase the surface area of the sheet and decrease its thickness. The apparatus includes a support structure upon which is mounted four substantially perpendicular working beams disposed in a common plane and arranged to define an enclosed center area for receiving the sheet to be stretched. One of the beams is fixed to the support to provide a fixed reference. Another pair of the beams which have a common corner are movable in perpendicular directions away from the center of the sheet when the sheet is placed in the enclosed area. The fourth beam is movable along its length and parallel to the side of the sheet to follow the stretching action. A plurality of movable clamping means are equally spaced along the beams for gripping the sheet to be stretched. Drive means are operatively coupled to move the three movable beams and subject the sheet to a stretching force. Guide means are provided for maintaining the beams in relative alignment when they are in motion.

The preferred drive means is a single hydraulic actuator mounted in the support structure and connected with the movable beams by a plurality of tension lines. Return lines move the beams in a direction opposite to the direction in which they move when the sheet is being stretched.

Preferably, the clamping means include power operated holding means for engaging the clamping means with the sheet and for exerting a holding force to prevent disengagement between the sheet and the clamps during the stretching operation. Corner clamps are fixedly secured to one beam and movably engage the other adjacent beam such that gripping portions of the clamps are in alignment with diagonals connecting opposite corners of the beams.

An upper portion of each clamp is preferably movable to enable its withdrawal from a lower portion of the clamp. This facilitates the insertion of sheets in the apparatus. Complicated and time consuming set-up operations, which often had to be performed on prior art stretching apparatus, are thereby substantially eliminated.

The single actuator of this apparatus, together with the beam which provides the fixed reference and the guide means for the other beams, assures that the sheet is subjected to the same elongation between opposed clamps in both directions. The heretofore relatively frequent optical distortions in stretched sheets caused by unequal forces from a plurality of actuators are thereby prevented. The working beams are all disposed in a common plane to eliminate torsional moments under the large stretching forces. The apparatus is therefore ideally suited for stretching heavy sheets ranging in thickness up to two and one-half inches or even more.

BRIEF DESCRIPTION OF THE DRAWINGS

FIG. 1 is a plan view of a stretching apparatus in accordance with the present invention and showing a sheet being stretched in phantom lines;

FIG. 2 is a front elevational view of the apparatus shown in FIG. 1;

FIG. 3 is a fragmentary plan view of the connection between two movable beams;

FIG. 4 is a fragmentary elevational view, in section, taken along lines 4—4 of FIG. 3;

FIG. 5 is a fragmentary plan view of another connection between two movable beams and also showing clamps mounted on the beams;

FIG. 6 is a schematic, perspective view of the arrangement of working beams and their connection with the drive mechanism; and FIG. 7 is a fragmentary and enlarged elevational view, in section, taken along lines 7—7 of FIG. 5 showing an open clamp in phantom lines.

DESCRIPTION OF THE PREFERRED EMBODIMENTS

Referring to FIGS. 1 and 2, a stretching apparatus 14 for stretching a sheet 16 includes a support structure 18 which carries four working beams. A first working beam 24 is fixedly secured to the supporting structure to provide a fixed reference. A second working beam 26 which is movable in the direction of its longitudinal axis is disposed perpendicularly with respect to the first beam. A third working beam 28 adjacent the other end of the first beam is movable in the direction of the longitudinal axis of the first beam 24. A fourth beam 30 is parallel to the first beam and movably engages the third beam 28 such that all movements of the third beam are transmitted to the fourth beam 30. An end 32 of the fourth beam 30 opposite from the end engaging the third beam 28 is in engagement with the second beam 26 such that movements of the second beam are transmitted to the fourth beam.

A plurality of clamps 34 are arranged on each beam in a side-by-side relation and are movable in a direction parallel to the axes of the respective beams on which they are located. The clamps engage the sheet 16 adjacent its edges 36. A drive means 38 mounted in the supporting structure 18 provides forces for moving the three movable beams and thereby stretching the sheet 16 along two perpendicular directions. The drive means causes beams 28 and 30 each to move the same distance toward or away from their respective opposites 26 and 24. The stretching action is uniform about the center 40 of the sheet with the exception of small portions adjacent the edges of the sheet. These portions are cut off and discarded when the sheet is processed into a finished product.

To assure an even pull, all working beams are disposed in a common plane. If they were in different planes, torsional moments would be introduced, and this would require a more cumbersome machine.

Guide means maintain the beams aligned in a common plane while they move relative to each other. The guide means for the beam 26 include elongated rails 44 secured to the support structure adjacent and parallel to the axis of the beam 26. A plurality of low friction rollers 46 secured to the beam engage the rails. The beam 26 is thus movable along the rails 44 parallel to its axis and to one of the edges 36 of the plastic sheet 16.

FIGS. 3 and 4 illustrate the guide means for maintaining the beams 26 and 30 in alignment with each other while they are in motion. An end 48 of the beam 26 defines a box-shaped channel 50 aligned in the direction of the axis of the beam 30 and it accommodates the end 32 of the beam 30. A plurality of rollers 52 project into the channel. The rollers ride on elongated tracks 54 on inner sides of the H-shaped beam 30. The rollers are arranged such that the beams 26 and 30 remain perpendicular to each other and the beam 30 is axially movable through the box-shaped channel 50.

Referring to FIG. 5, the other end 56 of the beam 30 includes a pair of horizontal flanges 58 which mount rollers 60 having vertical axes. A roller is disposed on either side of an end flange 62 of the H-shaped beam 28 and is in engagement with elongated tracks 64 secured to the flange. Rollers 65 have horizontal axes, are secured to the beam 30, and engage the horizontal surface of the flange 62 to support the weight of the beam 30 on the beam 28. Thus, the beam 30 is movable relative to the beam 28 in a direction parallel to the axis of the beam 28.

Referring now to FIG. 1, the beam 28 is movable parallel to the axis of the beam 24 and for that purpose engages flanges 68 and guide rails 70 of the beam 24 in the same manner that the beam 30 engages the beam 28, as described above with reference to FIG. 5. The beam 24 also supports the weight of the beam 28 adjacent its end 66. As shown in FIG. 5, the other end 72 of the beam 28 includes a plurality of rollers 73 which engage elongated guide tracks 74 on the support structure 18. Rollers 75 support the weight of the beam 28 adjacent its end 72 on the support structure 18.

Referring to FIG. 6, the drive means 38 preferably comprises a hydraulic actuator 83 which is mounted in the support structure 18 as shown in FIG. 2, and its axis is aligned with the axis of the beam 26. A piston rod 80 is connected with a cross-head 82 and is movable by pressurizing the portion of the cylinder of the actuator 83 which is on one or the other side of a piston in the actuator in a conventional manner. Tension lines are connected to a side 84 of the cross-head facing away from the hydraulic actuator. The tension lines may be plate chains, link chains, or steel cables. A pair of chains 88 is connected with the cross-head such that they are flexible about horizontal axes. The chains are looped over a pair of pulleys 90 and are connected with the beam 26 by a conventional plate chain connector 92 (shown in FIGS. 3 and 4) secured to an end of the beam 26 adjacent the box shaped channel 50.

A second pair of chains 94 is also secured to the cross-head. The chains 94 are flexible about vertical axes and they pass over a pair of pulleys 96. The other ends of these chains are secured to a chain transition 98 which, in turn, is connected with a chain 100. The chain 100 is flexible about horizontal axes. It is looped over pulleys 101, and it is secured to the end 72 of the beam 28 to enable it to pull that beam parallel to the beam 24 and away from the beam 26.

The beam 26 includes a downwardly extending flange 102 which is secured to a chain 104 extending in a direction opposite to chains 88 and 94. The chain 104 is looped over a pulley and it extends parallel to beam 24 past the third beam 28. It is looped over pulley 106 and secured to the beam 28 adjacent its end 66 and on the same side on which chain 100 is secured to the beam. A chain transmission 107 is included in chain 104 to make its respective ends flexible about transverse axes.

A chain 108 has an end secured to an anchor 110 mounted on the fixed support structure, and it passes over a pulley 112 rotatable about a vertical axis. The pulley is secured to the beam 28 adjacent its end 72. The other end of chain 108 is connected with the beam 30 adjacent its side facing away from the beam 24.

In the initial position before the sheet 16 has been stretched, the beams are disposed adjacent the edges 36 of the unstretched sheet, and the cross-head 82 of the hydraulic actuator 38 is in a position farthest from the cylinder 83. To commence the stretching operation, pressurized fluid from a suitable source (not shown) is introduced into the cylinder to retract the piston rod into the cylinder in a conventional manner. The chains 88 subject the beam 26 and the end 32 of the beam 30 to a force acting along the axis of the beam 26. This force is also transmitted to the end 66 of the beam 28 via the flange 102 and chain 104. That end of the beam 28 is thereby subjected to a force acting parallel to the axis of the beam 24. Forces to which the chains 94 and 100 are subjected are transmitted to the end 72 of the beam 28. They act parallel to the forces which act on end 66 of the beam.

Thus, retraction of the piston and cross-head moves the beam 28 away from the center 40 of the plastic sheet 16 (shown in FIG. 1) in a direction parallel to the axis of the beam 24. The movement of the beam 28 along that direction is duplicated by the beam 30 which is connected to the beam 28 at their junction. The second beam 26 moves along its axis under the force from chains 88. This movement is also duplicated by the beam 30 which is connected to the beam 26 through the box-shaped channel 50. Thus, the beam 30 also moves away from the center 40 of the plastic sheet, but in a direction transverse to the axis of the beam 24. Chain 108 applies an equal force to the other end 56 of the beam 30 to provide uniform action and prevent wedging along the moving members.

As the cross-head continues to move the area enclosed by the four beams becomes progressively larger, the enlargement of the enclosed area being proportional to its original configuration in all directions. The sheet 16 which is secured to the beams by the clamps 34 enlarges its surface area correspondingly. After the sheet is stretched, the clamps are released and the sheet may be removed.

A plurality of return lines, preferably conventional steel cables, are provided to transmit to the beams the movement of the piston rod 80 and cross-head 82 in a direction opposite to the direction they move while the sheet is being stretched.

The return cables of the drive mechanism may be of substantially lighter construction since they do not transmit any stretching forces. They have to overcome only friction between the moving beams and the support structure.

A first return cable 116 (shown in FIGS. 2 and 6) has ends secured to the flange 102 and the side of the cross-head 82 facing the hydraulic cylinder. It is looped over a pulley 118 and moves the beam 26 to its original position during the return stroke of the piston rod and cross-head. This movement is also transmitted to the beam 28 by a pair of second return cables 120 which are respectively secured to the ends of that beam. The cables are guided over stationary pulleys 122, and while the beam 26 returns to its original position, they move the beam 28 in a direction toward the beam 26. The return movement is imparted on the end 56 of the beam 30 by a third return cable 124 which is secured to that end. It is guided over a pulley 126 mounted on the beam 28, and is fixed to an end of the stationary beam 24. When the second return cables 120 move the beam 28 toward the beam 26, the third cable 124 moves the end 56 of the beam 30 toward the beam 24.

The end 32 of the beam 30 which is disposed in the box-shaped channel 50 moves back to its original position with the return movement of the beam 26.

Operation of the actuator 38 thus moves the four working beams in exact synchronism in one or the other direction. Movements of one beam in one direction are necessarily duplicated by corresponding movements of all other beams since all beams are coupled to each other and the actuator. The transmittal of equal motions in a pair of perpendicular directions is thereby assured, and reliable stretching action is achieved every time the machine operates.

The hydraulic system for the actuator 38 is preferably provided with control means (not shown) which regulates the rate at which it is actuated in a conventional manner. This enables the apparatus to stretch sheets of different thickness.

Referring to FIGS. 5 and 7, the clamps 34 are arranged in banks along each of the working beams. They are movable relative to each other and relative to the beams in directions parallel to the axis of the respective beams on which they are mounted. Elongated guide tracks 130 and 132 are mounted on the beams and engage suitable rollers 134 secured to a carriage 136. Each clamp has a lower gripping portion 138 which is part of an L-shaped leg 140 mounted on the carriage. An outer face 142 of the flanges of the H-shaped beams includes a guide track 144 with a horizontal guide surface engaging a roller 146 mounted horizontally on the L-shaped leg 140. The rollers 134 and 146 together with guide tracks 130 and 144 guide the clamp in its movement along the beam. Roller 134 and track 132 steady the carriage and prevent it from wedging during its movement. The stretching forces are transmitted from the beam to the clamp by vertical roller 134 and guide track 130.

An upper gripping portion 148 is pivotally secured to the carriage and mounts holding means, such as a hydraulic actuator 150. The latter moves an upper holding pad 152 towards a vertically aligned lower holding pad 154. The pads engage the sheet 16 disposed between them, and when the actuator 150 is energized, the pads securely connect the sheet to the working beam on which the clamp is mounted.

A pneumatic actuator 156 is pivotally secured to the carriage 136, and it has a piston rod 158 connected with the upper gripping portion 148. Retraction of the rod into the cylinder of the pneumatic actuator pivots the upper gripping portion in a clockwise direction, as viewed in FIG. 7. The upper holding pad 152 is thereby retracted past a vertical projection of the adjacent edge 36 of the sheet 16, as shown in phantom lines in FIG. 7. A conventional automatic locking mechanism (not shown) may be employed to maintain the upper gripping portion 148 in a holding position in which the upper and lower pads 152 and 154 are aligned, without transmitting the holding force from the hydraulic actuator 150 to the pneumatic actuator 156. This locking mechanism may be a mechanical latch extending between the carriage 136 and the upper gripping portion 148 which holds the upper gripping portion in the holding position until it is released, such as by a pneumatic actuator.

The ability of the upper gripping portion 148 to be pivoted clear of the plastic sheet 16 enables insertion and removal of the sheet with conventional hoisting means, such as an overhead crane. Simple holding fixtures can be used for inserting the sheet. It can be lowered directly onto the lower pads 154 of the lower gripping portions 138.

The arrangement and spacing of the clamps is the subject of copending application Ser. No. 768,245. The amount of material which is usable is an inverse function of the spacing between the clamps. Thus, it is preferable to employ small clamps that are closely spaced. The spacing should be less than five inches and preferably two to three inches, for stretching typical sheets of plastic for fabrication into aircraft windows and the like.

During the stretching operation, the sheet elongates both in a direction parallel to and traverse to the adjacent beams. Thus, the clamps 34, which are initially spaced closely adjacent one another, move away from each other and increase their lateral spacing progressively. To stretch the sheet solely by subjecting it to perpendicularly acting forces, it is important to avoid the transfer of forces from the clamps to the sheet which are other than perpendicular to the working beam on which they are mounted. Friction between the clamps and the beams should be minimized by the use of low friction roller bearings.

The possibility of one or more of the clamps becoming wedged in the guide tracks should also be eliminated since such wedging can cause substantial forces along a direction parallel to the beam mounting the clamp. This is accomplished by a linkage 160 which comprises a pair of elongated bars 162 for each carriage which, at their centers, are pivotally secured to each other and to the carriages 136, as illustrated by the pivot 163 of FIG. 7. The ends of the bars for adjacent carriages are also pivotally secured to each other such that movement of one bar 162 is necessarily duplicated by all others. Movement of one carriage thereby causes an identical movement of all other carriages connected with the linkage. The linkage 160 positively prevents the wedging of a carriage and the resulting unequal movement of the clamps which, ultimately, may tear the plastic sheet.

Each working beam has a stationary member 164 affixed to one end of the beam. One end of the linkage 160 of each working beam is secured to the stationary member 164 of the working beam, as illustrated by the pivot 165 on FIG. 5, to assure return of all clamps to their original position. The other end of the linkage is secured to a last or corner clamp 166 in the bank of clamps on the associated working beam. The corner clamp is connected to the stationary member 164 of the adjacent working beam. Relative movements of that adjacent working beam are transmitted to the corner clamp which then moves along the axis of the beam. The linkage transmits the movement of the corner clamp to all other clamps disposed on the beam.

As shown in FIG. 5, the lower gripping portion of the corner clamp 166 is affixed to the fixed member 164 of the adjacent beam 30. The beam 28 and the carriage for the clamp 166 are movable with respect to one another. The corner clamps include an upper gripping portion which is pivotal and in every respect identical to the upper gripping portion 148 on all other clamps. The upper and lower holding pads 176 for the corner clamps are symmetrical about the diagonal between opposing corners defined by the working beams.

The corner clamps 166 transmit forces to the sheet 16 which act parallel to adjacent beams and which are therefore perpendicular to each other. If no "double-acting" corner clamps were provided a narrow strip of the sheet adjacent its edges 36 would not be subjected to stretching forces. With the corner clamps, however, the sheet is continuously, from the commencement of the stretching operation until its termination, subjected to forces which are equally distributed over the full width of the sheet and which maintain their relative directions throughout the operation.

The sheet is preferably heated to a rubbery state so as to reduce the forces required to deform it, and to reduce the danger of rupturing it during the stretching process. This is done in an oven or furnace in accordance with prior art techniques that are well known.

In operation, the actuator 38 is first moved up to its starting position. The three movable working beams are moved inwardly to receive the sheet 16 in the enclosed area defined by them.

The pneumatic actuators 156 are energized to pivot the upper gripping portions 148 of the clamps 34 and 166 into the open position. The heated sheet is then lowered until it is supported by the lower holding pads 154 and 176 of the clamps. If the plastic sheet is relatively thin, say of a thickness of less than about an inch, a support fixture may be placed in the center of the area defined by the working beams to present excessive sagging of the sheet while it is still in a rubbery state. Thereafter the pneumatic actuators are actuated to pivot the upper gripping portion of the clamps into alignment with the lower portions. The hydraulic actuators 150 are energized to bias the upper holding pads into engagement with the sheet and to apply a holding force to the sheet.

After all clamps have been set, the actuator 38 is energized to subject the working beams to a stretching force and to move them as has been described above.

The work stroke of the actuator 38 continues at the applicable rate until the thickness of the sheet has been reduced by the desired amount. Then the working beams are maintained in fixed position, by the application of constant hydraulic pressure to the actuator 38, so that the working beams cannot move towards their original position until the sheet 16 has cooled to about room temperature. This holding operation is necessary to counteract contractive forces within the cooling sheet.

After the sheet has cooled the hydraulic actuators 150 of the clamps 34 are de-energized and the upper gripping portion 148 is pivoted into an open position to permit removal of the stretched sheet by suitable hoisting means. Thereafter the actuator 38 of the drive means is energized to return the working beams to their starting position for repeating the above operation.

The minimum size of the sheet 16 that can be stretched on the apparatus is determined by the number of clamps on each working beam and their minimum lateral spacing. The summation of all spacings on each beam then determines the minimum dimension of the sheet. To enable the stretching of small sheets a plurality of clamps on each beam can be removed. They are removed by disconnecting them from their pivotal connection 163 with the linkage 160 and removing a corresponding number of bars 162 from each beam. All clamps are connected with hydraulic lines (not shown) for energizing the hydraulic and pneumatic actuators 150 and 156. Those clamps which are removable to permit the stretching of small size sheets are preferably hydraulically connected in series with each other and parallel to all other clamps. This substantially reduces the effort required for removing the clamps and for maintaining the hydraulic connections of all other clamps with the power source.

What we claim is:
1. Apparatus for stretching sheet material comprising:
   (a) a first beam which is stationary,
   (b) a second beam which is movable along its length,
   (c) third and fourth beams respectively movable at right angles to their length,
   the four beams defining an area for accommodating the sheet to be stretched,
   (d) means connected to the respective beams for gripping the sheet to be stretched and for moving with the edges of the sheet in accordance with the amount that it is stretched so as to prevent undesirable stresses along the periphery of the sheet, and
   (e) drive means for moving the second beam along its length and third and fourth beams away from the center of the sheet to be stretched so as to stretch the sheet along two perpendicular axes.

2. Apparatus for stretching sheet material along two axes comprising:
   (a) a fixed beam,
   (b) a second beam movable along its longitudinal axis and disposed perpendicularly with respect to the fixed beam,
   (c) a third beam movable at right angles with respect to its longitudinal axis and disposed perpendicularly with respect to the fixed beam,
   (d) a fourth beam movable at right angles with respect to its longitudinal axis and disposed perpendicularly with respect to the second and third beams, the four beams enclosing a rectangular space for receiving the sheet to be stretched,
(e) clamping means located along the respective beams for engaging the sheet to be stretched,
the clamping means being movable along the respective beams in accordance with the stretching of the sheet which is to be stretched, and
(f) means for moving the second, third and fourth beams outwardly or inwardly in synchronism to enlarge or reduce the space enclosed by the four beams.

3. Apparatus according to claim 2 wherein the four beams are located in a common plane so as to avoid torsion in the apparatus and in the sheet material to be stretched.

4. Apparatus according to claim 2 wherein the means for moving the second, third and fourth beams is a single actuator which is mechanically connected to the three beams.

5. Apparatus according to claim 4 wherein the actuator is a hydraulic cylinder.

6. Apparatus according to claim 2 wherein the clamping means comprises equally spaced clamps, and wherein the clamping surfaces of the respective corner clamps are located on diagonals connecting opposing corners defined by the beams and exert a stretching force in perpendicular directions which are parallel to the adjacent beams.

7. Apparatus according to claim 2 wherein the clamping means comprises a plurality of equally spaced clamps having upper and lower clamping pads, and means for mounting the upper pad for pivoting away from the lower pad to expose the lower pads of the plurality of clamps throughout a region as large as the sheet tobe stretched for receiving the sheet to be stretched from a direction normal to the common plane.

8. Apparatus for stretching sheet material along two axes comprising:
(a) a fixed beam,
(b) a second beam movable along its longitudinal axis on stationary guides and disposed perpendicularly with respect to the fixed beam,
the second beam having an opening extending perpendicularly through the beam at the end which is farthest from the fixed beam,
(c) a third beam movable at right angles with respect to its longitudinal axis along stationary guides and disposed perpendicularly with respect to the fixed beam, (d) a fourth beam movable at right angles with respect to its longitudinal axis and disposed perpendicularly with respect to the second and third beams,
one end of the fourth beam extending through the opening in the second beam, and the other end engaging the third beam and being movable along guides on the third beam,
with the four beams enclosing a rectangular space in a common plane for receiving the sheet to be stretched,
(e) a plurality of clamps disposed along each beam for gripping the sheet to be stretched and mounted on the respective beams by a linkage which permits the individual clamps to move along the respective beams to accommodate the stretching of the sheet while maintaining the spacing between the clamps equidistant so as to avoid the introduction of undesired stresses into the sheet to be stretched, and
(f) a single actuator coupled to the second and third beams,
for applying force to the second beam along its longitudinal axis to move it and also to thereby move the fourth beam at right angles with respect to its length, and for applying force to the third beam to move it at right angles with respect to its length a like distance as the fourth beam.

9. Apparatus according to claim 4 wherein the actuator is connected to the second, third and fourth beams by flexible tension members.

References Cited
UNITED STATES PATENTS

| | | | |
|---|---|---|---|
| 333,737 | 1/1886 | Fougeadoire | 38—102.5 |
| 1,342,396 | 6/1920 | Solomon | 38—102.4 |
| 1,392,123 | 9/1921 | Danisi | 38—102.5 |
| 2,759,217 | 8/1956 | Peterson | 18—1 |
| 2,918,696 | 12/1959 | Bottoms et al. | |
| 3,287,765 | 11/1966 | Puente. | |
| 3,457,608 | 7/1969 | Gageur | 26—61 |

J. SPENCER OVERHOLSER, Primary Examiner

R. L. SPICER, JR., Assistant Examiner

U.S. Cl. X.R.

38—102.5